United States Patent [19]
Shioda et al.

[11] Patent Number: 5,493,699
[45] Date of Patent: Feb. 20, 1996

[54] LOW NOISE COMMUNICATION ANALOG COMPRESSOR AND ANALOG EXPANDER

[75] Inventors: Shinobu Shioda, Yokohama; Masayuki Sahoda, Kawasaki, both of Japan

[73] Assignee: Kabushiki Kaisha Toshiba, Japan

[21] Appl. No.: 186,559

[22] Filed: Jan. 26, 1994

[30] Foreign Application Priority Data

Jan. 29, 1993 [JP] Japan .................................. 5-013599

[51] Int. Cl.⁶ ...................................................... H04B 1/64
[52] U.S. Cl. ............................. 455/72; 333/14; 381/106
[58] Field of Search ............................. 455/72, 43, 116; 370/7, 109; 381/106; 333/14; 327/309

[56] References Cited

U.S. PATENT DOCUMENTS

| | | | |
|---|---|---|---|
| 4,642,582 | 2/1987 | Fucito et al. | 455/72 X |
| 4,701,722 | 10/1987 | Dolby | 333/14 |
| 5,023,490 | 6/1991 | Gittinger | 327/309 |
| 5,293,139 | 3/1994 | Polonen et al. | 333/14 |

OTHER PUBLICATIONS

CICC '93, "1.8V CMOS Analog Compander with 80dB Dynamic Range", pp. 16.1.1–16.1.4, S. Shioda.

*Primary Examiner*—Reinhard J. Eisenzopf
*Assistant Examiner*—Philip J. Sobutka
*Attorney, Agent, or Firm*—Banner & Allegretti, Ltd.

[57] ABSTRACT

A signal processing circuit includes two analog signal processors, an operational amplifier, a rectifier, and a reference potential generator. Each analog signal processor has four input terminals and two output terminals, and is designed to operate such that the first and second output terminals are set at the same potential and that a current difference between the first and second output terminals is proportional to a product of a potential difference between the first and second input terminal and a potential difference between the third and fourth input terminal. The first, second, third and fourth input terminals of the first analog signal processor are connected to receive an input signal, a first reference potential, a second reference potential, and a third reference potential, respectively. The output terminals of the first analog signal processor are connected to the negative and positive input terminals of the operational amplifier, respectively. The first, second, third and fourth input terminals of the second analog signal processor are connected to receive an output signal of the operational amplifier circuit, a fourth reference potential, the second reference potential, and a difference between the second reference potential and an output potential of a rectifier circuit, respectively. The output terminals of the second analog signal processor are connected to the negative and positive input terminals of the operational amplifier.

19 Claims, 5 Drawing Sheets

LOW NOISE COMMUNICATION ANALOG COMPRESSOR AND ANALOG EXPANDER

BACKGROUND OF THE INVENTION

1. Field of the Invention

The present invention relates to an analog compressor and an analog expander for use in a mobile communication apparatus such as a mobile telephone, which is designed to reduce signal noise.

2. Description of the Related Art

Generally a compander is used to reduce signal noise in a mobile telephone. A compander comprises a compressor circuit and an expander circuit which are provided in the transmitting section and receiving section of a mobile telephone, respectively.

An example of conventional companders of this type is disclosed in K. Takasuka, *A Sigam Delta Based Square-Law Compander*, Proceeding of CICC, 1990. This compander comprises a compressor circuit and a expander circuit, which will be described in the following.

The compressor circuit includes a $\Sigma\Delta$-modulation type A/D converter ($\Sigma\Delta$ADC), a D/A converter (DAC), a low-pass filter (LPF), a rectifier, a polarity detector, a clock generator, and a potential detector. The $\Sigma\Delta$ADC is connected to receive an input signal vin. The DAC receives the output of the $\Sigma\Delta$ADC and a reference potential. The LPF removes noise from a signal output from the DAC, thereby generating an output signal Vout. The rectifier rectifies or smoothes the output signal Vout, thus providing a DC potential and applying it to the $\Sigma\Delta$ADC. The polarity detector detects the polarity of the input signal Vin. The clock generator generates a clock signals for controlling the rectifier, in accordance with the output of the polarity detector. The potential detector detects the output potential of the rectifier.

The expander circuit disclosed in *A Sigam Delta Based Square-Law Compander* is designed to expand the signals compressed by the compressor circuit, thereby converting them back to uncompressed ones. The expander circuit comprises a $\Sigma\Delta$-modulation type A/D converter ($\Sigma\Delta$ADC), a rectifier, a polarity detector, a clock generator, a D/A converter (DAC), and a low-pass filter (LPF). $\Sigma\Delta$ADC receives an input signal Vin and a reference potential. The rectifier rectifies or smoothes the input signal Vin, thus providing a DC potential. The polarity detector detects the polarity of the input signal Vin. The clock generator generates a clock signals for controlling the rectifier, in accordance with the output of the polarity detector. The DAC receives the output of the $\Sigma\Delta$ADC and the output of the rectifier. The LPF removes noise from a signal output from the DAC, thereby generating an output signal Vout.

Both the compressor circuit and the expander circuit are digital circuits of $\Sigma\Delta$-modulation type. Each has a $\Sigma\Delta$-modulation type A/D converter and a $\Sigma\Delta$-modulation type D/A converter. The A/D converters and the D/A converters are used as multipliers. Hence, the compressor circuit and the expander circuit constitute a compander. Since the compressor circuit and the expander circuits process digital signals, the compander is inevitably a complex and large-scale circuit, the signals are delayed considerably, and the sound reproduced from the output signals are of low quality. Furthermore, the low-pass filter, used as a smoothing filter, is indispensable in the output section. This renders the compander larger and more complex. Complex and large-scale, the compander consumes much power.

In short, the conventional analog compander is disadvantageous in that its circuit configuration is complex and large-scale, it delays signals considerably, and the sound reproduced from its output signals is of low quality, and it consumes much power.

SUMMARY OF THE INVENTION

The object of the present invention to provide an analog compressor and an analog expander whose circuit configuration is relatively simple and small, which delay signals but a little, which output high-quality sound signals, and whose power consumption is small.

According to a first aspect of the invention, there is provided an analog compressor circuit which comprises:

- a first analog signal processing circuit having first to fourth input terminals and first and second output terminals, and designed to operate such that the first and second output terminals are set at the same potential and that a current difference between the first and second output terminals is proportional to a product of a potential difference between the first and second input terminal and a potential difference between the third and fourth input terminal, the first, second, third and fourth input terminals connected to receive an input signal, a first reference potential, a second reference potential and a third reference potential, respectively;
- an operational amplifier circuit having a positive input terminal and a negative input terminal connected to the second and first output terminals of the first analog signal processing circuit, respectively;
- a rectifier circuit for rectifying a signal output from the operational amplifier circuit; and
- second analog signal processing circuit having first to fourth input terminals and first and second output terminals connected to the negative and positive input terminals of the operational amplifier circuit, respectively, and designed to operate such that the first and second output terminals are set at the same potential and that a current difference between the first and second output terminals is proportional to a product of a potential difference between the first and second input terminal and a potential difference between the third and fourth input terminal, the first, second, third and fourth input terminals connected to receive an output signal of the operational amplifier circuit, a fourth reference potential, the second reference potential, and a difference between the second reference potential and an output potential of the rectifier circuit, respectively.

According to a second aspect of this invention, there is provided an analog expander circuit which comprises:

- a rectifier circuit for rectifying an input signal;
- a first analog signal processing circuit having first to fourth input terminals and first and second output terminals, and designed to operate such that the first and second output terminals are set at the same potential and that a current difference between the first and second output terminals is proportional to a product of a potential difference between the first and second input terminal and a potential difference between the third and fourth input terminal, the first, second, third and fourth input terminals connected to receive the input signal, a first reference potential, a second reference potential, and a difference between the second reference potential and an output potential of the rectifier circuit, respectively;

an operational amplifier circuit having a positive input terminal and a negative input terminal connected to the second and first output terminals of the first analog signal processing circuit, respectively;

second analog signal processing circuit having first to fourth input terminals and first and second output terminals connected to the negative and positive input terminals of the operational amplifier circuit, respectively, and designed to operate such that the first and second output terminals are set at the same potential and that a current difference between the first and second output terminals is proportional to a product of a potential difference between the first and second input terminal and a potential difference between the third and fourth input terminal, the first, second, third and fourth input terminals connected to receive an output signal of the operational amplifier circuit, a third reference potential, the second reference potential, and a fourth reference potential, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described, with reference to the accompanying drawings. Any component shown in one drawing, that is identical or corresponding to one shown in any other drawing, is designated at the same reference numeral and will not be described in detail once so explained.

Figure 1:
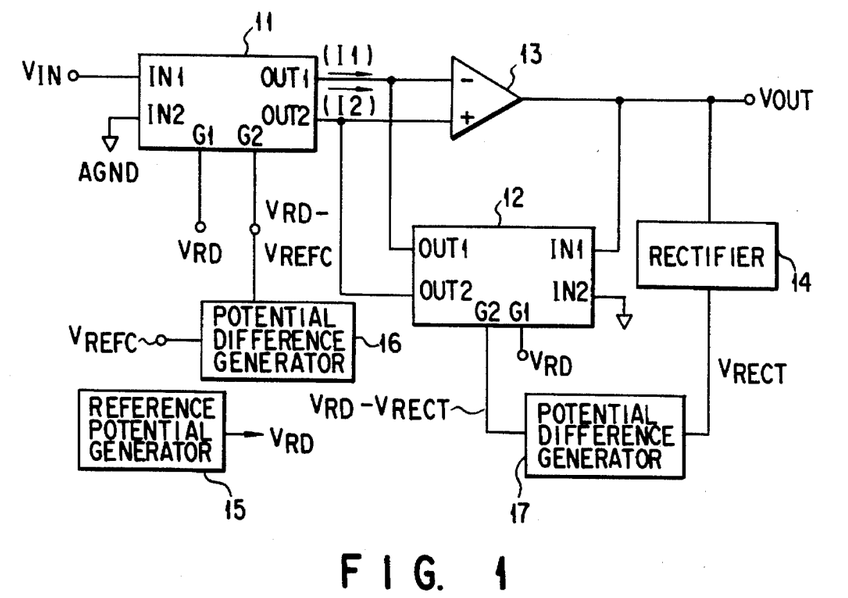
FIG. 1 is a block diagram showing the analog compressor circuit incorporated in an analog compander according to a first embodiment of this invention.

The analog compressor circuit incorporated in an analog compander according to a first embodiment of this invention will be described with reference to FIG. 1. As shown in FIG. 1, the analog compressor circuit comprises a first analog signal processor 11, a second analog signal processor 12, a differential operational amplifier 13, a rectifier 14, a reference voltage generator 15, and two potential difference generators 16 and 17.

Each of the analog signal processors 11 and 12 have a first input terminal IN1, a second input terminal IN2, a third input terminal G1, a fourth input terminal G2, a first output terminal OUT1, and a second output terminal OUT2. The analog signal processors 11 and 12 are identical in internal circuit structure. In each analog signal processor, the output terminals OUT1 and OUT2 are set at the same potential. Each processor functions such that the current difference (I1–I2) between the first and second output terminals OUT1 and OUT2 is proportional to the product of the potential difference (V1–V2) between the input terminals IN1 and IN2 and the potential difference (VG1–VG2) between the third and fourth terminals G1 and G2. Namely, the following equation holds true of both analog signal processors 11 and 12:

$$(I1-I2)=K(V1-V2)(VG1-VG2) \qquad 1$$

where K is a constant of proportion.

An input signal VIN to be compressed is supplied to the first input terminal IN1 of the first analog signal processor 11 which is connected to the input of the operational amplifier 13. First and second reference potentials are applied to the second and third input terminals IN2 and G1 of the first analog signal processor 11, respectively. A third reference potential is applied to the fourth input terminal G2 of the the first analog signal processor 11. The first and second output terminals OUT1 and OUT2 of the first analog signal processor 11 are connected to the negative (−) and positive (+) input terminals of the operational amplifier 13, respectively. The first reference potential applied to the second input terminal IN2 of the processor 11 is analog ground voltage AGND. The second reference applied to the third input terminal G1 of the processor 11 is the potential VRD generated by the reference potential generator 15. The third reference potential applied to the fourth input terminal G2 of the signal processor 11 is the potential difference of VRD–VREFC generated by the potential difference generator 16 to which a reference potential VREFC has been applied.

The rectifier 14 rectifies and smoothens the output of the operational amplifier 13, thereby providing a DC potential VRECT. The potential VRECT is applied to the potential difference generator 17. The generator 17 generates a potential which is the difference between the potential VRD and the DC potential VRECT.

The output of the operational amplifier 13 is supplied to the first input terminal IN1 of the second analog signal processor 12. The first and second reference potentials are applied to the second and third input terminals IN2 and G1 of the second analog signal processor 12, respectively. The potential (VRD–VRECT) generated by the potential difference generator 17 is applied to the fourth input terminal G4 of the processor 12. The first and second output terminals OUT1 and OUT2 of the second analog signal processor 12 are connected to the negative (−) and positive (+) input terminals of the operational amplifier 13, respectively. The first reference potential applied to the second input terminal IN2 of the processor 12 is the analog ground voltage AGND. The second reference applied to the third input terminal G1 of the processor 12 is the potential VRD.

Negative feedback is applied to the operational amplifier 13 through the second analog signal processor 12, whereby the positive and negative input terminals of the amplifier 13 are virtually grounded. The potentials at both input terminals of the amplifier 13 equal the analog ground voltage AGND. As in most cases, the input impedance of the operational amplifier 13 is so high that the input current flowing into the amplifier 13 can be regarded as almost "0." Thus, from Equation 1, we obtain the following equation for the first analog signal processor 11:

$$(I1 - I2) = K(V1 - V2)(VG1 - VG2) \qquad 2$$
$$= K(VIN - 0)\{VRD - (VRD - VREFC)\}$$
$$= K \cdot VIN \cdot VREFC$$

For the second analog signal processor 12, we obtain the following equation:

$$(I1 - I2) = K(V1 - V2)(VG1 - VG2) \qquad 3$$
$$= K(VOUT - 0)\{VRD - (VRD - VRECT)\}$$
$$= K \cdot VOUT \cdot VRECT$$

Since the output VOUT of the amplifier 13 and the output VRECT of the rectifier 14 are proportional to each other. From Equations 2 and 3 it is obvious that VOUT is proportional to $(VREFC \cdot VIN)^{0.5}$. Namely:

$$VOUT = K1(VREFC \cdot VIN)^{0.5} \qquad 4$$

where K1 is the constant of proportion. In terms of gain (dB), VOUT is expressed as follows:

$$VOUT(dB) = (0.5 \, VIN) + K1' \qquad 5$$

where K1' is a constant. Thus, the analog compressor circuit shown in FIG. 1 has a gain slope of 0.5, or ½.

Figure 2:
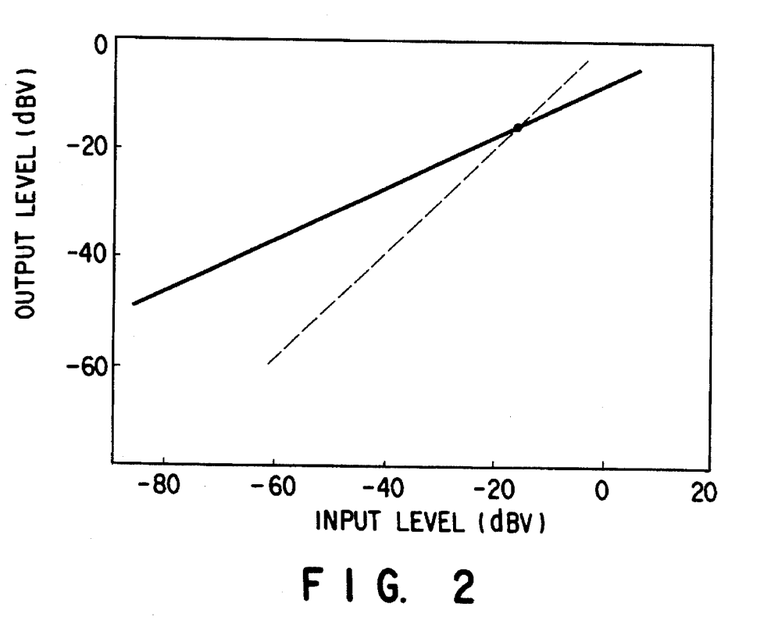
FIG. 2 is a diagram representing the gain characteristic of the analog compressor circuit of FIG. 1.

FIG. 2 represents the gain characteristic of the analog compressor circuit of FIG. 1. More precisely, the solid line indicates the analog compressor circuit, whereas the broken line shows the characteristic the circuit would exhibit if its gain were 1. As the solid line shows, the output level (dBV) changes at half the rate that the input level (dBV) changes. As can be understood from FIG. 2, the point (VIN=VOUT) where the solid line and the broken line cross may be shifted merely by changing the reference potential VREFC.

In the analog compressor shown in FIG. 1, the input signal is compressed by analog processing. Therefore, the input signal is delayed but far less than in the analog compressor circuit described above. Hence, the signal is converted into sound which is free of echo distortion and is of high quality. Further more, since both analog signal processors 11 and 12 have a simple structure as will be described, the analog compressor, as a whole, is relatively simple in circuit configuration and can, thus, be made small. Its power consumption can therefore be small.

Figure 3:
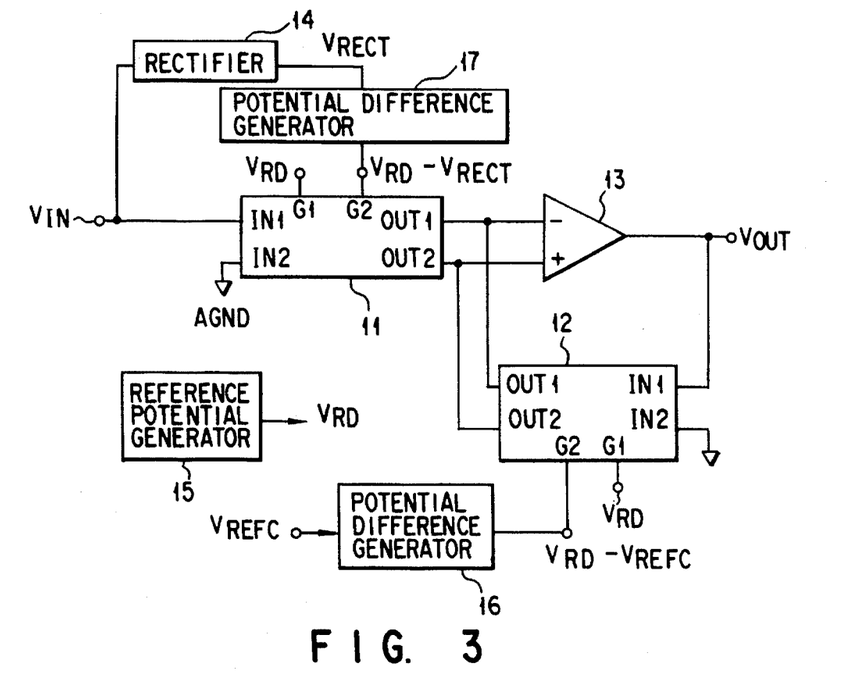
FIG. 3 is a block diagram showing the analog expander circuit used in an analog compander according to a second embodiment of the present invention.

The analog expander circuit incorporated in an analog compander according to a second embodiment of this invention will be described with reference to FIG. 3. The expander circuit is designed to expand a signal which has been compressed by an analog compressor circuit of the type shown in FIG. 1 As shown in FIG. 3, like the analog compressor circuit shown in FIG. 1, it comprises a first analog signal processor 11, a second analog signal processor 12, an operational amplifier 13, a rectifier 14, a reference voltage generator 15, and two potential difference generators 16 and 17. An input signal VIN is the output signal OUT of the analog compressor circuit.

The analog expander circuit differs from the analog compressor circuit identical to the circuit of FIG. 1 in two respects. First, the input signal VIN is supplied to the rectifier 14, the potential difference generator 17 generates a potential which is the difference between the reference potential VRD and the output VRECT of the rectifier 14, and this potential is applied to the fourth input terminal G2 of the first analog signal processor 11. Secondly, the output potential (VRD–VREFC) of the potential difference generator 16 is applied to the fourth input terminal G2 of the second analog signal processor 12.

In the circuit of FIG. 3, as well, negative feedback is applied to the operational amplifier 13 through the second analog signal processor 12, whereby the positive and negative input terminals of the amplifier 13 are virtually grounded. The potentials at both input terminals of the amplifier 13 equal the analog ground voltage AGND. The input impedance of the operational amplifier 13 is so high that the input current flowing into the amplifier 13 can be regarded as almost "0." Thus, from Equation 1, we obtain the following equation for the first analog signal processor 11:

$$(I1 - I2) = K(V1 - V2)(VG1 - VG2) \qquad 6$$
$$= K(VIN - 0)\{VRD - (VRD - VRECT)\}$$
$$= K \cdot VIN \cdot VRECT$$

For the second analog signal processor 12 shown in FIG. 3, we obtain the following equation:

$$(I1 - I2) = K(V1 - V2)(VG1 - VG2) \qquad 7$$
$$= K(VOUT - 0)\{VRD - (VRD - VREFC)\}$$
$$= K \cdot VOUT \cdot VREFC$$

Since the input signal VIN and the output VRECT of the rectifier 14 are proportional to each other. From Equations 6 and 7 it is obvious that VOUT is proportional to $1/VREFC \cdot VIN^2$. Namely:

$$VOUT = K2 \cdot 1/VREFC \cdot VIN^2 \qquad 8$$

where K2 is the constant of proportion. In terms of gain (dB), VOUT is expressed as follows:

$$VOUT(dB) = (2VIN) + K2' \qquad 9$$

where K2' is a constant. Thus, the analog expander circuit shown in FIG. 1 has a gain slope of 2.

Figure 4:
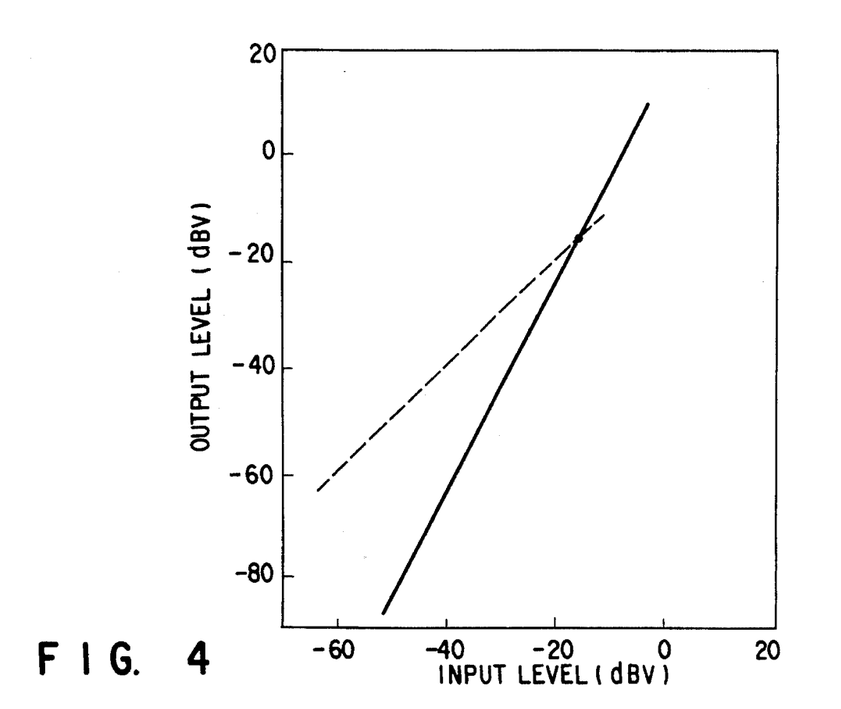
FIG. 4 is a diagram representing the gain characteristic of the analog expander circuit shown in FIG. 3.

FIG. 4 represents the gain characteristic of the analog expander circuit of FIG. 3. More precisely, the solid line indicates the analog compressor circuit, whereas the broken line shows the characteristic the circuit would exhibit if its gain were 1. As the solid line shows, the output level (dBV) changes at twice the rate that the input level (dBV) changes. As can be understood from FIG. 4, the point (VIN=VOUT) where the solid line and the broken line cross may be shifted merely by changing the reference potential VREFC.

In the analog expander shown in FIG. 3, the input signal is expanded by analog processing. Therefore, the input signal is delayed but far less than in the analog compressor circuit described above. Hence, the signal is converted into sound which is free of echo distortion and is of high quality. Furthermore, since both analog signal processors 11 and 12 of the analog expander have a simple structure as will be described, the analog expander, as a whole, is relatively simple in circuit configuration and can, thus, be made small. Its power consumption can therefore be small.

The analog signal processors 11 and 12 will be described in detail, which are incorporated in each of the circuits shown in FIGS. 1 and 3 and which perform the functions described above.

These circuits may be each the MOS resistive circuit disclosed in, for example, Zdzislaw Czarnul, *Novel MOS Resistive Circuit for Synthesis of Fully Integrated Continuous-time Filters*, Proceedings of IEEE, 1986, Vol. cas-33, No. 7, July 1986. One of these circuits will be described in detail, with reference to FIG. 5.

Figure 5:
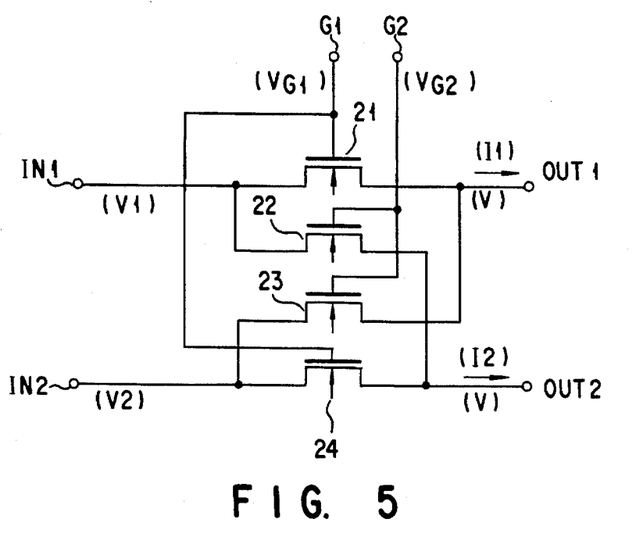
FIG. 5 is a circuit diagram illustrating one of the two identical analog signal processors incorporated in the analog compressor circuit shown in FIG. 1 and also in the analog expander circuit shown in FIG. 3.

As shown in FIG. 5, the circuit comprises four MOS transistors 21 to 24 which have the same size and which are of the same polarity type, e.g., N-channel type. The first MOS transistor 21 has its source connected to the source of the second MOS transistor 22. The first input terminal IN1 is connected to the node of the sources of the MOS transistors 21 and 22. The third MOS transistor 23 has its source connected to the source of the fourth MOS transistor 24. The second input terminal IN2 is connected to the node of the sources of the MOS transistors 23 and 24. The drain of the first MOS transistor 21 is connected to the drain of the third MOS transistor 23. The first output terminal OUT1 is connected to the node of the drains of the MOS transistors 21 and 23. The drain of the second MOS transistor 22 is connected to the drain of the fourth MOS transistor 24. The second output terminal OUT2 is connected to the node of the drains of the MOS transistors 22 and 24.

Alternatively, the drains of the MOS transistors 21 and 22 may be connected to each other, and the first input terminal IN1 may be connected to the node of the drains of the MOS transistors 21 and 22; the drains of MOS transistor 23 and 24 may be connected to each other, and the second input terminal IN2 may be connected to the node of the drains of the MOS transistors 23 and 24; the source of the first MOS transistor 21 may be connected to the source of the third MOS transistor 23, and the first output terminal OUT1 may be connected to the node of the drains of the MOS transistors 21 and 23; and the source of the second MOS transistor 22 may be connected to the source of the fourth MOS transistor 24, and the second output terminal OUT2 is connected to the node of the drains of the MOS transistors 22 and 24.

Hence, the source-drain path of the first MOS transistor 21 is connected at one end to the first input terminal IN1 and at the other end to the first output terminal OUT1. The source-drain path of the second MOS transistor 22 is connected at one end to the first input terminal IN1 and at the other end to the second output terminal OUT2. The source-drain path of the third MOS transistor 23 is connected at one end to the second input terminal IN2 and the first output terminal OUT1. The source-drain path of the fourth MOS transistor 24 is connected between the second input terminal IN2 and the second output terminal OUT2.

The gate of the first MOS transistor 21 is connected to the gate of the fourth MOS transistor 24. The third input terminal G1 is connected to the node of the gates of the MOS transistors 21 and 24. The gate of the second MOS transistor 22 is connected the gate of the third MOS transistor 23. The fourth input terminal G2 is connected to the node of the gates of the MOS transistors 22 and 23.

As is generally known, the source-drain current IDS of a MOS transistor operating in an unsaturated region is given as follows:

$$IDS = K3\{2(VGS-VTH)VDS - VDS^2\} \qquad 10$$

where VGS is the gate-source voltage, VTH is the threshold voltage, VDS is the drain-source voltage, and K3 is a constant of proportion.

The constant K3 is ½·μ·COX (W/L), where μ is the mobility of effective carriers, COX is the capacity per unit area of the gate insulating film, w is the channel width, and L is the channel length. Assuming that the first to fourth MOS transistors 21 to 24 have the same size and operate in an unsaturated region, they satisfy the conditions of Equation 1, which do not depend on the threshold voltage VTH of each MOS transistor. If the threshold voltage VTH is lowered, thereby broadening the unsaturated region in which each MOS transistor can operate, the analog signal processor will be able to operate at a low voltage and will become suitable for use in a mobile telephone which is battery-driven.

Figure 6:
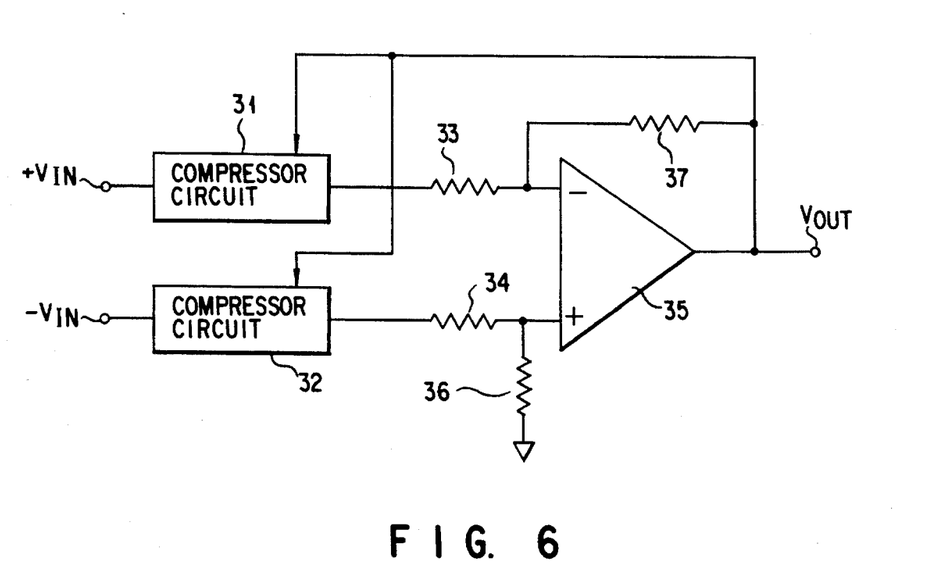
FIG. 6 is a block diagram showing the analog compressor circuit incorporated in an analog compander according to a third embodiment of the invention.
Figure 7:
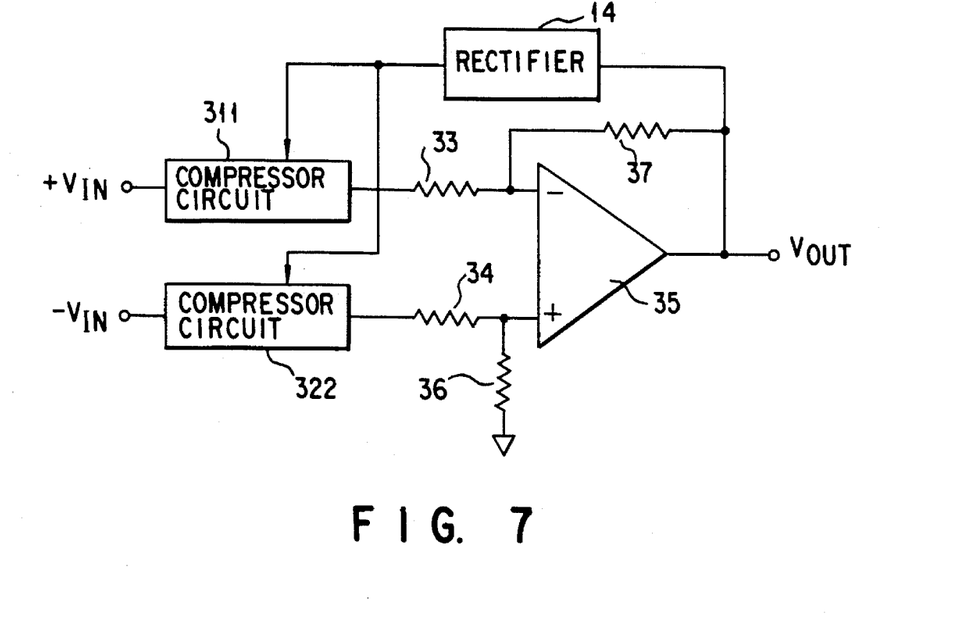
FIG. 7 is a block diagram showing the analog compressor circuit used in an analog compander according to a fourth embodiment of the present invention.
Figure 8:
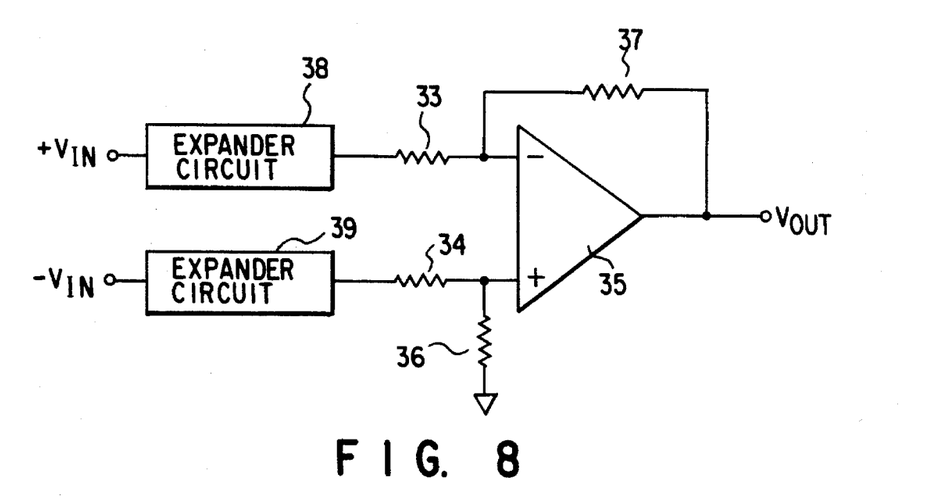
FIG. 8 is a block diagram illustrating the analog expander circuit incorporated in an analog compander according a fifth embodiment of the invention.

The third to fifth embodiments of the present invention will be described, with reference to FIGS. 6, 7, and 8. FIG. 6 shows the analog compressor circuit incorporated in an analog compander according to the third embodiment. FIG. 7 illustrates the analog compressor circuit used in an analog compander according to the fourth embodiment. FIG. 8 shows the analog expander circuit incorporated in an analog compander according the fifth embodiment. To these circuits, complementary signals +VIN and −VIN are input.

The complementary-input analog compressor circuit shown in FIG. 6 has two compressor circuits 31 and 32. These circuits 31 and 32 are identical in structure to the circuit shown in FIG. 1. That is, each of them comprises two analog signal processors 11 and 12, a differential operational amplifier 13, a rectifier 14, a reference potential generator 15 and two potential generators 16 and 17. However, the output of the operational amplifier 13 is not supplied to the rectifier 14.

Complementary input signals +VIN and −VIN are supplied to the compressor circuits 31 and 32, respectively. The outputs of the circuits 31 and 32 are supplied via resistors 33 and 34 to the negative (−) and positive (+) input terminals of an operational amplifier 35, respectively. A resistor 36 is connected at one end to the positive input terminal of the amplifier 35 and at the other end to the ground. A feedback resistor 37 is connected at one end to the negative input terminal and at the other end to the output terminal of the amplifier 35. The operational amplifier 35 and the resistors 33, 34, 36 and 37 constitute an adder circuit for adding the output signal of the compressor circuit 32 and the signal obtained by inverting the output signal of the compressor circuit 31. The output of the amplifier 35 is supplied to the rectifiers 14 incorporated in the compressor circuits 31 and 32.

The analog compressor circuit used in the analog compander according to the fourth embodiment, which is shown in FIG. 7, is different from the circuit of FIG. 6 in that only one rectifier 14 is provided for both compressor circuits 311 and 322.

The analog expander circuit incorporated in the analog compander according the fifth embodiment, which is shown in FIG. 8, is identical in structure to the analog compressor of FIG. 6, except that two expanders 38 and 39 of the same type shown in FIG. 3 are used in place of the compressor circuits 31 and 32 shown in FIG. 6. To the rectifier 14 used in each of these expander circuits 11 and 12, complementary signals +VIN and −VIN are input.

Figure 9:
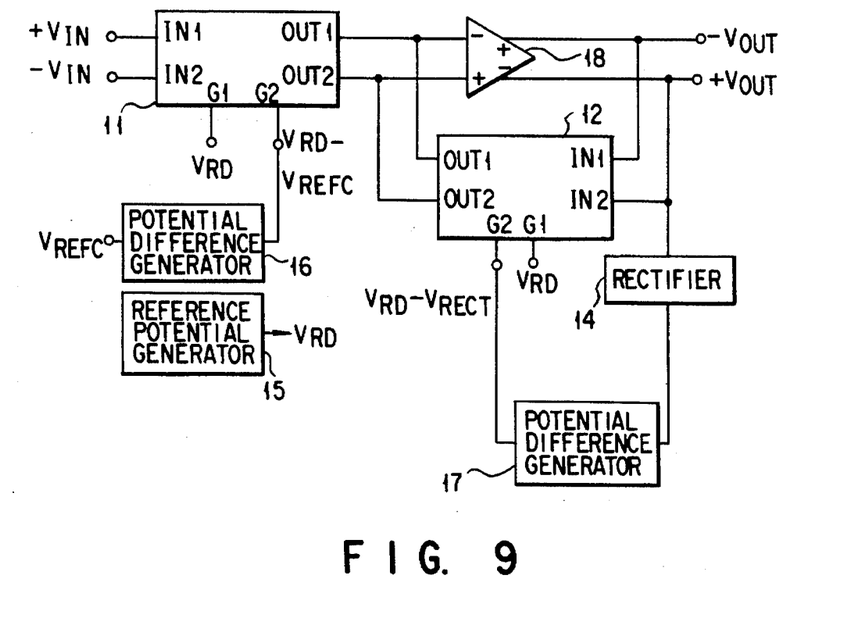
FIG. 9 is a block diagram showing the analog compressor circuit used in an analog compander according to a sixth embodiment of this invention.
Figure 10:
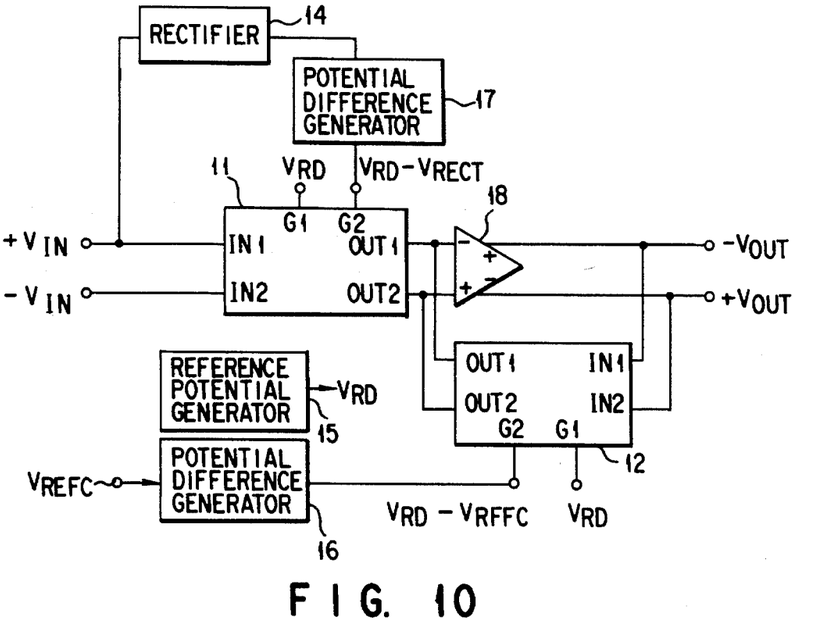
FIG. 10 is a block diagram showing the analog expander circuit incorporated in an analog compander according to a seventh embodiment of this invention.

The sixth and seventh embodiments of the present invention will be described, with reference to FIGS. 9 and 10. FIG. 9 shows the analog compressor circuit used in an analog compander according to the sixth embodiment. FIG. 10 shows the analog expander circuit incorporated in an analog compander according to the seventh embodiment.

The analog compressor circuit shown in FIG. 9 differs from the analog compressor circuit of FIG. 1 in three respects. First, an operational amplifier 18, which receive differential inputs and produces differential outputs, is used instead of the operational amplifier 13 (FIG. 1) which receives differential inputs. Second, complementary input signals +VIN and −VIN are supplied to the first and second input terminals IN1 and IN2 of the first analog signal processor 11, respectively. Third, output signal +VOUT output from the negative output terminal (−) of the operational amplifier 18 is supplied to the second input terminal IN2 of the second analog signal processor 12.

The analog expander circuit shown in FIG. 10 differs from the analog expander circuit of FIG. 3 in three respects, exactly in the same way as the circuit of FIG. 9 differs from the circuit of FIG. 1. Namely, first, an operational amplifier 18, which receive differential inputs and produces differential outputs, is used instead of the operational amplifier 13 (FIG. 3) which receives differential inputs. Second, complementary input signals +VIN and −VIN are supplied to the first and second input terminals IN1 and IN2 of the first analog signal processor 11, respectively. Third, output signal +VOUT output from the negative output terminal (−) of the operational amplifier 18 is supplied to the second input terminal IN2 of the second analog signal processor 12.

In both the circuits of FIGS. 9 and 10, either being a differential-input/differential output circuit, no mobility modulation occurs at all, unlike in the circuit of FIG. 5 wherein mobility modulation is caused by the gate voltages in the signal processors 11 and 12. Hence, the circuits shown in FIGS. 9 and 10 have a small distortion factor.

The present invention is not limited to the embodiments described above. Various changes and modifications can be made within the scope of the invention. For instance, the first and second analog signal processors incorporated in each embodiment can have any structure other than the one shown in FIG. 5, so long as they perform the functions specified above.

As has been explained, the present invention can provide an analog compander whose circuit configuration is relatively simple and small, which delays signals but a little, which outputs high-quality sound signals, and whose power consumption is small.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An analog compressor circuit comprising:

a first analog signal processing circuit having first to fourth input terminals and first and second output terminals, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive an input signal, a first reference potential, a second reference potential and a third reference potential, respectively;

an operational amplifier circuit having a positive input terminal and a negative input terminal connected to the second and first output terminals of said first analog signal processing circuit, respectively;

a rectifier circuit for rectifying a signal output from said operational amplifier circuit; and second analog signal processing circuit having first to fourth input terminals and first and second output terminals connected to the negative and positive input terminals of said operational amplifier circuit, respectively, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive an output signal of said operational amplifier circuit, a fourth reference potential, the second reference potential, and a difference between the second reference potential and an output potential of said rectifier circuit, respectively.

2. The analog compressor circuit according to claim 1, wherein the first reference potential and the fourth reference potential are both analog ground potentials.

3. The analog compressor circuit according to claim 1, further comprising a potential difference generator for generating a difference between the second reference potential and an output potential of said rectifier circuit.

4. The analog compressor circuit according to claim 1, wherein the input signal is one of a positive signal and a negative signal which are complementary to each other; one of the positive and negative signals is supplied as an input signal to the first input terminal of said first analog signal processing circuit, and the other of the positive and negative signals is supplied as the first reference potential to the second input terminal of said first analog signal processing circuit; and a signal output from the positive output terminal of said operational amplifier circuit is supplied to the first terminal of said second analog signal processing circuit, and a signal output from the negative output terminal of said operational amplifier is supplied, as the fourth reference potential, to the second input terminal of said second analog signal processing circuit.

5. The analog compressor circuit according to claim 1, wherein said first analog signal processing circuit comprises first to fourth MOS transistors having the same size and the same polarity; in said first analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal; said second analog signal processing circuit comprises first to fourth MOS transistors having the same size and the same polarity; and in said second analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal.

6. An analog expander circuit comprising:
   a rectifier circuit for rectifying an input signal;
   a first analog signal processing circuit having first to fourth input terminals and first and second output terminals, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive the input signal, a first reference potential, a second reference potential, and a difference between the second reference potential and an output potential of said rectifier circuit, respectively;
   an operational amplifier circuit having a positive input terminal and a negative input terminal connected to the second and first output terminals of said first analog signal processing circuit, respectively;
   second analog signal processing circuit having first to fourth input terminals and first and second output terminals connected to the negative and positive input terminals of said operational amplifier circuit, respectively, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive an output signal of said operational amplifier circuit, a third reference potential, the second reference potential, and a fourth reference potential, respectively.

7. The analog expander circuit according to claim 6, wherein the first reference potential and the third reference potential are both analog ground potentials.

8. The analog expander circuit according to claim 6, further comprising a potential difference generator for generating a difference between the second reference potential and an output potential of said rectifier circuit.

9. The analog expander circuit according to claim 6, wherein the input signal is one of a positive signal and a negative signal which are complementary to each other; one of the positive and negative signals is supplied as the input signal to the first input terminal of said first analog signal processing circuit, and the other of the positive and negative signals is supplied as the first reference potential to the second input terminal of said first analog signal processing circuit; and a signal output from the positive output terminal of said operational amplifier circuit is supplied to the first terminal of said second analog signal processing circuit, and a signal output from the negative output terminal of said operational amplifier is supplied, as the third reference potential, to the second input terminal of said second analog signal processing circuit.

10. The analog expander circuit according to claim 6, wherein said first analog signal processing circuit comprises first to fourth MOS transistors having the same size and the same polarity; in said first analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal; said second analog signal processing circuit comprises first to fourth MOS transistors having the same size and the same polarity; and in said second analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal.

11. An analog compressor circuit of complementary input type, comprising:
   a first analog compressor section for receiving an input signal which is one of a positive signal and a negative signal which are complementary to each other, and for generating an output signal having a gain of less than 1 with respect to the input signal;
   a second analog compressor section for receiving an input signal which is the other of the positive and negative signals which are complementary to each other, and for generating an output signal having a gain substantially equal to the gain of the output signal of said first analog compressor section; and
   an adder circuit for adding the output signal of said second analog compressor section and a signal obtained by inverting the output signal of said first analog compressor section.

12. The analog compressor circuit according to claim 11, wherein each of said first and second analog compressor sections comprises:
   a first analog signal processing circuit having first to fourth input terminals and first and second output terminals, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive an input signal, a first reference potential, a second reference potential, and a third reference potential, respectively;
   an operational amplifier circuit having a positive input terminal and a negative input terminal connected to the second and first output terminals of said first analog signal processing circuit, respectively;
   a rectifier circuit for rectifying a signal output from said adder circuit; and
   second analog signal processing circuit having first to fourth input terminals and first and second output terminals connected to the negative and positive input terminals of said operational amplifier circuit, respectively, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive an output signal of said operational amplifier circuit, an analog ground potential used as a fourth reference potential, the second reference potential, and a difference between the second reference potential and an output potential of said operational amplifier circuit, respectively.

13. The analog compressor circuit according to claim 12, wherein each of said first and second analog compressor sections further comprises a potential difference generator for generating a difference between the second reference potential and an output potential of said rectifier circuit.

14. The analog compressor circuit according to claim 12, wherein the rectifier circuits of said first and second analog compressor circuits are replaced by a single rectifier circuit.

15. The analog compressor circuit according to claim 12, wherein the first analog signal processing circuit of each of said first and second analog compressor sections comprises first to fourth MOS transistors having the same size and the same polarity; in said first analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal; the second analog signal processing circuit of each of said first and second analog compressor sections comprises first to fourth MOS transistors having the same size and the same polarity; and in said second analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal.

16. An analog expander circuit of complementary input type, comprising:

a first analog expander section for receiving an input signal which is one of a positive signal and a negative signal which are complementary to each other, and for generating an output signal having a gain of at least 1 with respect to the input signal;

a second analog expander section for receiving an input signal which is the other of the positive and negative signals which are complementary to each other, and for generating an output signal having a gain substantially equal to the gain of the output signal of said first analog expander section; and an adder circuit for adding the output signal of said second analog expander section and a signal obtained by inverting the output signal of said first analog expander section.

17. An analog expander circuit according to claim 16, wherein each of said first and second analog expander section comprises:

a rectifier circuit for rectifying an input signal;

a first analog signal processing circuit having first to fourth input terminals and first and second output terminals, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive the input signal, a first reference potential, a second reference potential, and a difference between the second reference potential and an output potential of said rectifier circuit, respectively;

an operational amplifier circuit having a positive input terminal and a negative input terminal connected to the second and first output terminals of said first analog signal processing circuit, respectively;

second analog signal processing circuit having first to fourth input terminals and first and second output terminals connected to the negative and positive input terminals of said operational amplifier circuit, respectively, and designed to operate such that said first and second output terminals are set at the same potential and that a current difference between said first and second output terminals is proportional to a product of a potential difference between said first and second input terminal and a potential difference between said third and fourth input terminal, said first, second, third and fourth input terminals connected to receive an output signal of said operational amplifier circuit, a third reference potential, the second reference potential, and a fourth reference potential, respectively.

18. The analog compressor circuit according to claim 17, wherein each of said first and second analog expander sections further comprises a potential difference generator for generating a difference between the second reference potential and an output potential of said rectifier circuit.

19. The analog expander circuit according to claim 17, wherein said first analog signal processing circuit of each of said first and second analog expander sections comprises first to fourth MOS transistors having the same size and the same polarity; in said first analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal; the second analog signal processing circuit of each of said first and second analog expander sections comprises first to fourth MOS transistors having the same size and the same polarity; and in said second analog signal processing circuit, said first MOS transistor has a source-drain path connected between the first input terminal and the first output terminal and a gate connected to the third input terminal, said second MOS transistor has a source-drain path connected between said first input terminal and said second output terminal and a gate connected to said fourth input terminal, said third MOS transistor has a source-drain path connected between said second input terminal and said first output terminal and a gate connected to said fourth input terminal, and said fourth MOS transistor has a source-drain path connected between said second input terminal and said second output terminal and a gate connected to said third input terminal.

* * * * *